(12) United States Patent
Jang

(10) Patent No.: US 12,189,395 B2
(45) Date of Patent: Jan. 7, 2025

(54) AUTONOMOUS MOBILE APPARATUS, DOCKING STATION, AND METHOD OF CONTROLLING SAME APPARATUS

(71) Applicants: Hyundai Motor Company, Seoul (KR); Kia Corporation, Seoul (KR)

(72) Inventor: Seong Won Jang, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 303 days.

(21) Appl. No.: 17/862,099

(22) Filed: Jul. 11, 2022

(65) Prior Publication Data
US 2023/0051680 A1   Feb. 16, 2023

(30) Foreign Application Priority Data

Aug. 11, 2021   (KR) .................. 10-2021-0106315

(51) Int. Cl.
| | | |
|---|---|---|
| *G05D 1/02* | (2020.01) | |
| *G01S 15/08* | (2006.01) | |
| *G01S 15/931* | (2020.01) | |
| *G01S 17/08* | (2006.01) | |
| *G01S 17/931* | (2020.01) | |
| *G05D 1/00* | (2006.01) | |

(52) U.S. Cl.
CPC ............ *G05D 1/0225* (2013.01); *G01S 15/08* (2013.01); *G01S 15/931* (2013.01); *G01S 17/08* (2013.01); *G01S 17/931* (2020.01)

(58) Field of Classification Search
CPC .... G05D 1/0225; G05D 1/0255; G01S 15/08; G01S 15/931; G01S 17/08; G01S 17/931; B60L 2260/32; B60L 53/16; B60L 53/35; B60L 53/53; B60L 15/20; B60L 2260/40; B60S 5/02; B60W 60/001; B60Y 2200/91
See application file for complete search history.

(56) References Cited

U.S. PATENT DOCUMENTS

| | | |
|---|---|---|
| 5,715,568 A | 2/1998 | Berfield et al. |
| 8,770,012 B2 | 7/2014 | Yahashi et al. |
| 9,138,115 B2 | 9/2015 | Stryker et al. |
| 9,840,154 B2 | 12/2017 | Kwa et al. |

(Continued)

FOREIGN PATENT DOCUMENTS

| | | | | |
|---|---|---|---|---|
| EP | 2658073 A1 | * | 10/2013 | ........... A01D 34/008 |
| GB | 2435247 A | * | 8/2007 | ................ B60P 3/36 |

(Continued)

OTHER PUBLICATIONS

KR 20160137889 A with English translation. Date filed Dec. 23, 2015. Date published Dec. 1, 2016. (Year: 2016).*

*Primary Examiner* — Calvin Cheung
(74) *Attorney, Agent, or Firm* — Morgan, Lewis & Bockius LLP

(57) ABSTRACT

An autonomous mobile apparatus that autonomously docks with a docking station, includes a main body including at least one connection unit connected to the docking station, a drive unit configured to move the main body, and a processor configured to control the drive unit, wherein the processor controls operation of the drive unit in a first mode for causing the main body to move in proximity to the docking station and a second mode for bringing the connection unit into contact with the docking unit of the docking station.

14 Claims, 3 Drawing Sheets

(56) References Cited

U.S. PATENT DOCUMENTS

| | | | |
|---|---|---|---|
| 10,133,277 B1 * | 11/2018 | Carrasco Zanini | H02J 7/00 |
| 10,709,308 B2 | 7/2020 | Buehler et al. | |
| 11,109,729 B2 | 9/2021 | Juettner et al. | |
| 11,147,425 B2 | 10/2021 | Windmeisser | |
| 2005/0010330 A1 * | 1/2005 | Abramson | G05D 1/0225 |
| | | | 318/568.12 |
| 2006/0069837 A1 * | 3/2006 | Zhang | G06F 1/1632 |
| | | | 710/303 |
| 2012/0125363 A1 * | 5/2012 | Kim | A47L 9/2852 |
| | | | 134/6 |
| 2012/0303190 A1 * | 11/2012 | Pfeiffer | B60L 53/30 |
| | | | 320/109 |
| 2012/0323365 A1 * | 12/2012 | Taylor | G05D 1/0225 |
| | | | 901/1 |
| 2013/0157565 A1 * | 6/2013 | Clement | H02J 50/10 |
| | | | 320/108 |
| 2014/0360832 A1 * | 12/2014 | Aldrich | B60L 9/08 |
| | | | 191/12.2 R |
| 2017/0043966 A1 * | 2/2017 | Witelson | G05D 1/0225 |
| 2019/0168619 A1 * | 6/2019 | Hooker | B60L 53/16 |
| 2020/0345190 A1 | 11/2020 | Buehler | |
| 2021/0053407 A1 | 2/2021 | Smith et al. | |
| 2021/0054701 A1 | 2/2021 | Holck | |

FOREIGN PATENT DOCUMENTS

| | | | | |
|---|---|---|---|---|
| JP | 2008-254079 | | 10/2008 | |
| JP | 2017-507687 | | 3/2017 | |
| KR | 10-0674564 | | 1/2007 | |
| KR | 10-2007-0104472 | | 10/2007 | |
| KR | 10-0919765 | | 9/2009 | |
| KR | 10-2019-0022458 | | 3/2019 | |
| WO | WO-2008002027 A1 * | 1/2008 | | A47L 9/2805 |
| WO | WO-2009022929 A2 * | 2/2009 | | A63B 47/021 |
| WO | WO-2010043640 A2 * | 4/2010 | | B25J 5/007 |

* cited by examiner

AUTONOMOUS MOBILE APPARATUS, DOCKING STATION, AND METHOD OF CONTROLLING SAME APPARATUS

CROSS REFERENCE TO RELATED APPLICATION

The present application claims priority to Korean Patent Application No. 10-2021-0106315, filed Aug. 11, 2021, the entire contents of which is incorporated herein for all purposes by this reference.

BACKGROUND OF THE PRESENT DISCLOSURE

Field of the Present Disclosure

The present disclosure relates to an autonomous mobile apparatus configured for smoothly docking with a docking station through compliance control when autonomously docking therewith and a docking station with which the autonomous mobile apparatus smoothly docks through the compliance control when autonomously docking therewith.

Description of Related Art

In recent years, there has been an increasing concern with autonomous mobile apparatuses. The autonomous mobile apparatus employs autonomous traveling technologies that enable autonomous traveling without operation by a user or an occupant, such as an operation of determining whether or not to start traveling, an operation of setting a traveling direction, and an operation of adjusting a traveling speed. Examples of the autonomous mobile apparatus include an autonomous traveling vehicle, an autonomous mobile robot, and a robot cleaner.

The autonomous mobile apparatus may be used in various ways according to its intended purpose, but needs to dock with a docking station for a predetermined time period. For example, the autonomous traveling vehicle needs to dock with its docking station for being supplied with fuel or for being charged with electricity, and the robot cleaner needs to dock with its docking station for being supplied with a cleaning solution and for being supplied with a replacement for the used water tank.

A drive unit of an autonomous mobile apparatus in the related art is controlled with a high power output for the autonomous mobile apparatus to make physical contact with its docking station. In the instant case, a main body of the autonomous mobile apparatus may be damaged due to the possible collision between the autonomous mobile apparatus and its docking station.

Mobile apparatuses, such as robots and vehicles, may operate through compliance control that complies with a surrounding environment to prevent damage and provide smooth contact with an object. An apparatus, when under the compliance control, may be protected against an excessive force exerted thereon. Thus, the compliance control is effective in operations to be performed for connection and contact between apparatuses.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an autonomous mobile apparatus configured for moving in proximity to a docking station so that the autonomous mobile apparatus comes with a predetermined distance from the docking station and then smoothly docking with the docking station through compliance control and a method of controlling the autonomous mobile apparatus. The autonomous mobile apparatus and the method of controlling the autonomous mobile apparatus provide the advantage of preventing possible collision between the autonomous mobile apparatus and the docking station.

Various aspects of the present disclosure are to provide a docking station with which an autonomous mobile apparatus docks through compliance control. The present compliance control is performed after the autonomous mobile apparatus moves in proximity with the docking station so that the autonomous mobile apparatus comes within a predetermined distance from the docking station.

The present disclosure is not limited to the above-described objectives. From the present specification and the accompanying drawings, other objectives would be understood by a person of ordinary skill in the art to which an exemplary embodiment of the present disclosure pertains.

According to various aspects of the present disclosure, there is provided an autonomous mobile apparatus that autonomously docks with a docking station, the apparatus including: a main body including at least one connection unit connected to the docking station; a drive unit configured to move the main body; and a processor configured to control the drive unit, wherein the processor is configured to control operation of the drive unit in a first mode for causing the main body to move in proximity to the docking station and a second mode for bringing the connection unit into contact with the docking unit of the docking station.

In the autonomous mobile apparatus, the processor may control the drive unit in the first mode to move the main body so that a distance between the main body and the docking station is equal to or smaller than a predetermined distance.

The autonomous mobile apparatus may further include a distance measurement detector configured to measure the distance between the main body and the docking station, wherein the processor switches from controlling the drive unit in the first mode to controlling the drive unit in the second control based on the distance measured by the distance measurement detector.

In the autonomous mobile apparatus, in the second mode, the processor may perform compliance control of the drive unit such that, with a force exerted on the main body, the connection unit is brought into contact with the docking unit.

In the autonomous mobile apparatus, a plurality of connection units may be provided, a plurality of connectors that correspond to the connection units, respectively, may be provided in the docking unit, the processor may perform control to detect whether all the connection units are brought into contact with the corresponding connectors, respectively, and when all the connection units are brought into contact with the corresponding connectors, respectively, the processor may determine that the contact is properly made.

In the autonomous mobile apparatus, when it is determined that the contact is properly made, the processor may control the drive unit so that the connection unit and the connector is physically fastened to each other.

In the autonomous mobile apparatus, when at least a connection unit is not brought into contact with the corresponding connectors, respectively, the processor may determine that the contact is improperly made, may perform control to detect the connection unit which is not in contact among the connection units, and may control the drive unit so that the connection unit not in contact are brought into contact with the corresponding connector.

In the autonomous mobile apparatus, the processor may control the drive unit for a predetermined time period or a predetermined number of times so that the connection unit is brought into contact with the docking unit, and when the predetermined time period elapses or the predetermined number of time is exceeded, the processor may control the drive unit so that the docking is interrupted.

According to various aspects of the present disclosure, there is provided a docking station with which an autonomous mobile apparatus docks, the station including: a docking unit connected to the autonomous mobile apparatus; a moving device configured to move the docking unit; and a controller configured to control the moving device, wherein when the autonomous mobile apparatus moves in proximity to the docking unit, the controller is configured to control operation of the moving device so that the docking unit is brought into contact with a connection unit of the autonomous mobile apparatus.

The docking station may further a distance measurement detector configured to measure a distance between the autonomous mobile apparatus and the docking station, wherein the controller may be configured to control the moving device so that the docking is brought into contact with the connection unit, based on the distance measured by the distance measurement detector.

In the docking station, the controller may perform compliance control of the moving device so that the docking unit is brought into contact with the connection unit.

In the docking station, the docking unit may include a plurality of connectors, a plurality of connection units that correspond to the connectors, respectively, may be provided in the autonomous mobile apparatus, the controller may perform control to detect whether all the connectors are brought into contact with the corresponding connection units, respectively, and when all the connectors are brought into contact with the corresponding connection units, respectively, the controller may be configured to determine that the contact is properly made.

In the docking station, when all the connectors are not brought into contact with the corresponding connection units, respectively, the controller may be configured to determine that the contact is improperly made, may perform control to detect the connector which is not in contact, and may control the moving device so that the connector not in contact is brought into contact with the corresponding connection unit.

According to yet another aspect of the present disclosure, there is provided a method of controlling an autonomous mobile apparatus that docks with a docking station, the method including: starting, by the autonomous mobile apparatus, docking; executing a first mode for causing the autonomous mobile apparatus to move to a docking unit of the docking station; executing a second mode for causing the autonomous mobile apparatus to bring a plurality of connection units into contact with a plurality of connectors, respectively, of the docking unit, when the autonomous mobile apparatus moves in proximity to the docking station so that the autonomous mobile apparatus comes within a predetermined distance; and connecting the connection unit and the docking unit to each other when it is determined that the connection unit is brought into proper contact with the docking unit.

In the method, in the executing of the second mode, compliance control of the autonomous mobile apparatus is performed so that with a force exerted on the autonomous mobile apparatus, the connection unit is brought into contact with the docking unit.

In the method, in the executing of the second mode, it may be determined whether all the connection units are brought into contact with the corresponding connectors, respectively, and when all the connection units are brought into contact with the corresponding connectors, respectively, it may be determined that the contact is properly made.

In the method, in the executing of the second mode, when at least a connection unit is not brought into contact with the corresponding connectors, respectively, it may be determined that the contact is improperly made, control may be performed to detect the connection unit which is not in contact among the connection units, and the autonomous mobile apparatus may be controlled so that the connection unit not in contact is brought into contact with the connector.

According to exemplary embodiments of the present disclosure, the autonomous mobile apparatus moves in proximity to the docking station, and then smoothly docks with the docking station through the compliance control. Thus, a situation where the autonomous mobile apparatus and the docking station collide with each other may be prevented.

Furthermore, according to the embodiments, when the autonomous mobile apparatus autonomously docks with the docking station, the autonomous mobile apparatus and the locking station are connected to each other in a state where all the connection units are brought into contact with the docking unit. Thus, the autonomous mobile apparatus and the locking station may be stably connected to each other.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
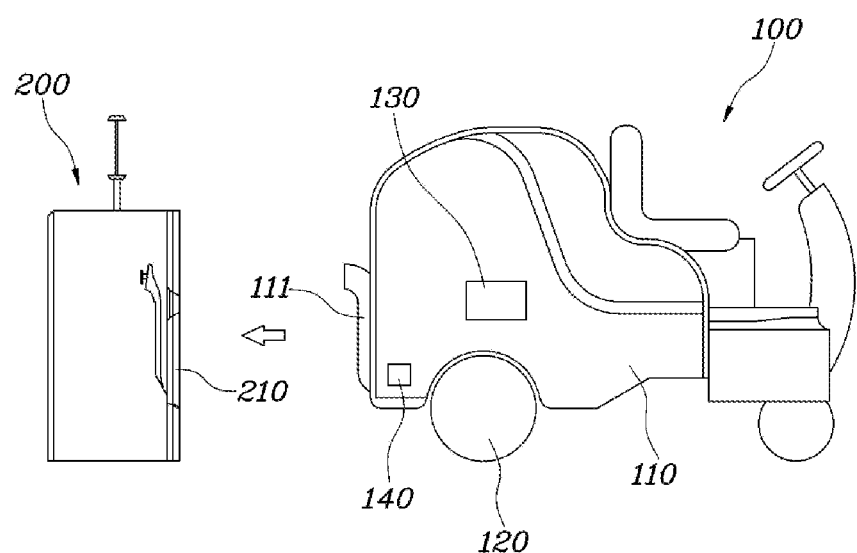
FIG. 1 is a view exemplarily illustrating a state where an autonomous mobile apparatus according to various exemplary embodiments of the present disclosure docks with a docking station.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A term to be used throughout the exemplary embodiment of the present disclosure is selected among general terms that are currently used as widely as possible, considering its meaning in context of the exemplary embodiment in which embodiments of the present disclosure is described. However, the present term may vary depending on the intention of a person of ordinary skill in the art, a judicial precedent, the appearance of a new technology, or the like. Furthermore, there may also be a term which is arbitrarily coined by the applicant. When such a term is used, the meaning thereof will be described in detail. Therefore, the meaning of the term which is used throughout the exemplary embodiment should be defined in light of the specification, not simply by the name of the term.

Unless otherwise particularly described, the expression "includes a constituent element", when used throughout the specification, means "further includes any other constituent element, not "excludes any other constituent element". The term "unit", "module", or the like, which may be used throughout the specification, means an individual component that performs at least one function or operation and may be realized in hardware, software, or a combination of both.

The exemplary embodiments of the present disclosure will be described in detail below with reference to the accompanying drawings so that a person of ordinary skill in the art to which an exemplary embodiment of the present disclosure pertains is enabled to practice the present disclosure without undue experimentation. However, various modifications may be made to the various exemplary embodiments of the present disclosure, and the present disclosure is not limited to the various exemplary embodiments that will be described below.

The exemplary embodiments of the present disclosure will be described in detail below with reference to the drawings. An autonomous mobile apparatus 100 throughout the exemplary embodiment of the present disclosure refers to an apparatus configured for independently determining a traveling direction and moving in the traveling direction without operation by a user or an occupant. For example, the autonomous mobile apparatus 100 according to various exemplary embodiments of the present disclosure may be an autonomous vehicle or an autonomous mobile robot. The autonomous mobile apparatus 100 according to the various exemplary embodiments of the present disclosure may not only move independently, but may also move to a docking station 200 for docking therewith and dock with the docking station 200.

FIG. 1 is a view exemplarily illustrating a state where the autonomous mobile apparatus 100 according to the various exemplary embodiments docks with the docking station 200.

With reference to FIG. 1, the autonomous mobile apparatus 100 according to the various exemplary embodiments of the present disclosure may include a main body 110, a drive unit 120, and a processor 130.

The main body 110 may include at least one connection unit 111 which is connected to the docking station 200. A process of docking the autonomous mobile apparatus 100 with the docking station 200 may be finished by connecting the connection unit 111 to a docking unit 210 of the docking station 200. The docking unit 210 may refer to a portion of the docking station 200 with which the connection unit 111 of the autonomous mobile apparatus 100 docks. For example, the docking station 200 may employ a ball locking structure in which at least one portion of the connection unit 111 which is inserted into the docking unit 210 is physically fastened by a locking ball to the docking unit 210. Furthermore, the connection unit 111 is brought into contact with the docking unit 210, and a signal is transmitted and received therebetween. In the present manner, the connection unit 111 and the docking unit 210 may be connected to each other. However, the above-described connection methods are provided only for illustrative purposes, and the present disclosure is not limited to these methods.

The drive unit 120 refers to a component configured for moving the main body 110. In other words, the autonomous mobile apparatus 100 may move according to operation of the drive unit 120. The drive unit 120 may include a moving unit, such as a wheel of an autonomous mobile vehicle or a leg or a wheel of an autonomous mobile robot, which is configured for adjusting a position of the autonomous mobile apparatus 100. Furthermore, although not illustrated, the drive unit 120 may include a motor or an engine that provides motive power to the moving unit, a steering device adjusting a direction of the moving unit, a steering wheel, and the like.

The processor 130 may control movement of the autonomous mobile apparatus 100 by controlling the operation of the drive unit 120. The processor 130 may control overall operations of the drive unit 120, such as determining of whether or not to start operation of the drive unit 120, setting of an operation direction, and adjusting of an operation speed. The processor 130 receives signals from various detectors mounted on the autonomous mobile apparatus 100. Accordingly, the processor 130 may perform control to detect a moving area or an obstacle and may search for an optimal moving path according to an objective of using the autonomous mobile apparatus 100. Furthermore, the processor 130 controls the drive unit 120 so that the autonomous mobile apparatus 100 moves along the optimal moving path which is found as a result of the search.

FIG. 1 illustrates essential constituent elements of the autonomous mobile apparatus 100 according to the various exemplary embodiments and an essential constituent element of the docking station 200 which is associated with the autonomous mobile apparatus 100. Therefore, it would be understood by a person of ordinary skill in the art to which an exemplary embodiment of the present disclosure pertains that constituent elements other than the essential constituent elements illustrated in FIG. 1 may be further included in the autonomous mobile apparatus 100 and the docking station 200.

When a docking condition is satisfied, the autonomous mobile apparatus 100 may start docking. For example, when an amount of charge remaining in a battery which is a power source for the drive unit 120 falls to or below a predetermine numerical value, the autonomous mobile apparatus 100 may start the docking. Alternatively, the autonomous mobile apparatus 100 that performs an automatic cleaning function may start the docking when an amount of remaining cleansing solution falls to or a predetermined numerical value.

When the docking condition is satisfied, the processor 130 may control the drive unit 120 of the autonomous mobile apparatus 100 according to the various exemplary embodiments in a first mode and in a second mode.

When the autonomous mobile apparatus 100 stars the docking, the processor 130 may control the drive unit 120 in the first mode for controlling the operation of the drive unit 120 so that the main body 110 moves in proximity to the docking station 200. When a distance between the main body 110 and the docking station 200 is equal to or smaller than a predetermined distance, the processor 130 may control the drive unit 120 in the second mode for connecting the connection unit 111 to the docking station 200.

The first mode and the second mode are described in detail with reference to the drawings.

Figure 2:
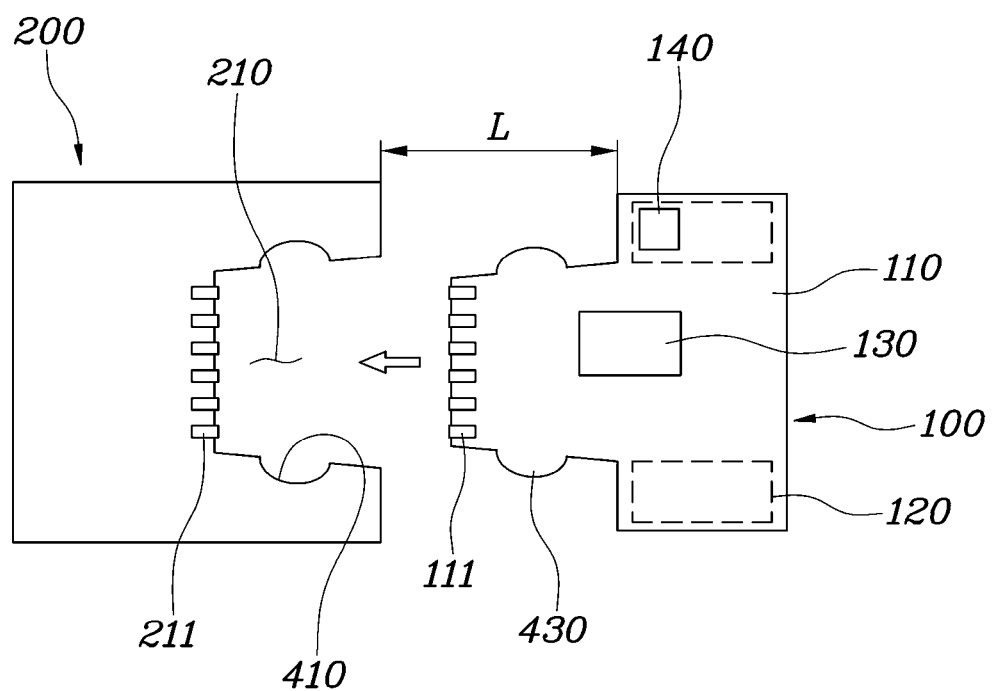
FIG. 2 is a view exemplarily illustrating a state where the autonomous mobile apparatus according to the various exemplary embodiments are driven in the first mode.

FIG. 2 is a view exemplarily illustrating a state where the autonomous mobile apparatus according to the various exemplary embodiments are driven in the first mode;

With reference to FIG. 2, the autonomous mobile apparatus 100 according to the various exemplary embodiments of the present disclosure may include a distance measurement detector 140 that measures a distance L between the main body 110 and the docking station 200. The distance measurement detector 140 may be an ultrasonic detector that transmits an ultrasonic wave and receives the ultrasonic wave reflected off the docking station 200. Furthermore, the distance measurement detector 140 may be an optical detector that emits light and receives the light reflected off the docking station 200, but the present disclosure is not limited to the present optical detector.

The distance measurement detector 140 may measure the distance L between the main body 110 and the docking station 200 and may transmit a result of the measurement to the processor 130. The distance measurement detector 140 according to the various exemplary embodiments which is illustrated in FIG. 2 is provided in the autonomous mobile apparatus 100. However, the distance measurement detector 140 may be provided in the docking station 200 and may be configured to transmit the result of the measurement to the processor 130.

In the first mode, the processor 130 may control the drive unit 120 so that the main body 110 moves in proximity to the docking station 200. For example, the processor 130 may control the drive unit 120 so that the main body 110 moves in proximity to the docking unit 210, by moving the main body 110 forward or backward in a state where the main body 110 is positioned in a straight line with the docking station 200.

The processor 130 may control the drive unit 120 based on an operating state of the drive unit 120 and a measurement value obtained by the distance measurement detector 140 so that the main body 110 moves in proximity to the docking station 200. For example, when the power source for the drive unit 120 is an electric motor, the processor 130 may compute a speed of the drive unit 120 based on electric current of the electric motor, may make a comparison with the distance L between the autonomous mobile apparatus 100 and the docking station 200 which is measured by the distance measurement detector 140, and thus may control the drive unit 120 so that the main body 110 moves in proximity to the docking station 200 at an appropriate speed. To prevent the main body 110 from colliding with the docking station 200, the processor 130 may control the drive unit 120 so that the nearer the main body 110 is to a point which is positioned the distance L away from the docking station 200, the more decreased a moving speed of the main body 110.

The processor 130 may switch from controlling the drive unit 120 in the first mode and to controlling the drive unit 120 in the second mode based on the distance L measured by the distance measurement detector 140. The control in the first mode is control that causes the autonomous mobile apparatus 100 to move in proximity to the docking station 200 so that the autonomous mobile apparatus 100 comes within a predetermined distance from the docking station 200. When the main body 110 comes within the distance L from the docking station 200, the connection unit 111 is positioned a suitable distance away from the docking unit 210, and thus, the processor 130 may control the drive unit 120 in the second mode for bringing the connection unit 111 into precise contact with the docking unit 210. The predetermined distance configured as a reference for switching from controlling the drive unit 120 in the first mode to controlling the drive unit 120 in the second mode may be suitably set according to a size of the autonomous mobile apparatus 100, a size of the docking station 200, a shape of the connection unit 111, and the like. For example, the predetermined distance may be equal to or greater than approximately 10 mm and equal to or smaller than approximately 1000 mm, and desirably, equal to or greater than approximately 100 mm and equal to or smaller than approximately 500 mm. However, the present disclosure is not limited to these sizes.

In the second mode, the processor 130 may perform compliance control of the drive unit 120 such that, with a force exerted on the main body 110, the connection unit 111 is brought into contact with the docking unit 210. Generally, when the connection unit 111 is brought into contact with the docking unit 210, the drive unit 120 is controlled with a high power output to bring the main body 110 into close contact with the docking station 200. Regardless of an outside force acts that varies according to situations of the main body 110 and the docking station 200, the main body 110 is controlled to move at a predetermined speed. For the present reason, there is a concern in the related art in that autonomous mobile apparatus 100 and the docking station 200 will collide with each other.

In the autonomous mobile apparatus 100 according to an exemplary embodiment of the present disclosure, the processor 130 controls the drive unit 120 in the first mode so that the main body 110 moves in proximity to the docking station 200 so that the autonomous mobile apparatus 100 comes within the predetermined distance from the docking station 200. Accordingly, the processor 130 controls the drive unit 120 through the compliance control for bringing the connection unit 111 into precise contact with the docking unit 210. In the present manner, when brought into contact with the docking unit 210, the connection unit 111 may be prevented from colliding with the docking unit 210.

Figure 3A:
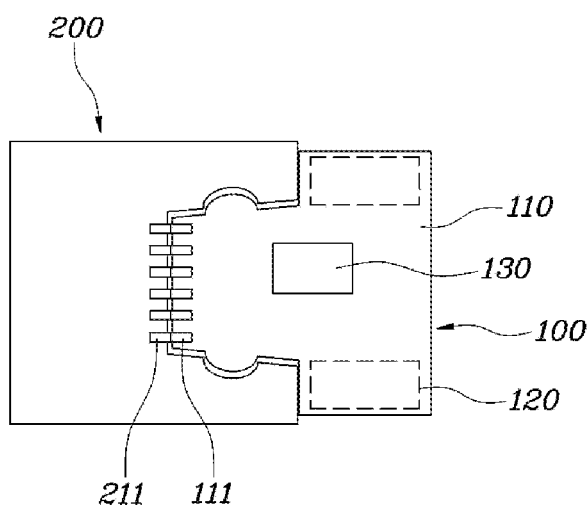
FIG. 3A and FIG. 3B are views each illustrating a state where the autonomous mobile apparatus according to the various exemplary embodiments are driven in the second mode.
Figure 3B:
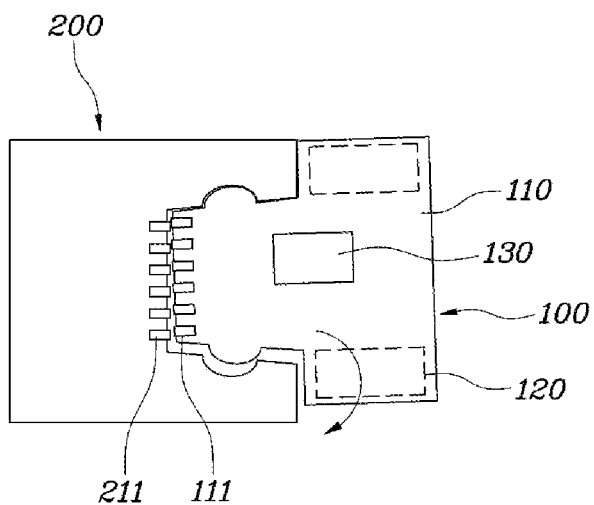

FIG. 3A and FIG. 3B are views each illustrating a state where the autonomous mobile apparatus 100 according to the various exemplary embodiments are driven in the second mode.

With reference to FIG. 3A and FIG. 3B, a plurality of connection units 111 may be provided, and a plurality of connectors 211 may be provided in the docking unit 210. The connectors 211 correspond to the connection units 111, respectively. When the autonomous mobile apparatus 100 makes contact with the docking unit 210, each of the connection unit 111 and each of the connector 211 may be arranged at opposite positions, respectively.

The autonomous mobile apparatus 100 may move in a proximity to the docking unit 210, and then the connections 111 may be brought into contact with the corresponding connectors 211, respectively. The processor 130 may control the drive unit 120 in the second mode so that all the connection units 111 are brought into contact with the connectors 211, respectively. At the present point, the processor 130 may precisely control the drive unit 120 through the compliance control.

Furthermore, the processor 130 may perform control to detect whether or not all the connect units 111 are brought into contact with the corresponding connector 211, respectively.

FIG. 3A illustrates a case where all the connection units 111 are brought into contact with the corresponding connectors 211, respectively, and where the autonomous mobile apparatus 100 makes proper contact with the docking station 200. When it is determined that the contact is properly made, the processor 130 may control the drive unit 120 so that the connection unit 111 is connected to the connector 211. For example, the processor 130 may control the drive unit 120 so that the main body 110 moves toward a direction in which the connector 211 is positioned so that at least one of the connection units 111 is inserted into the connector 211 and that the locking ball provided in the connector 211 physically fastens the connection unit 111 and the connector 211 to each other. When the processor 130 controls the drive unit 120 so that the connection unit 111 and the connector 211 are fastened to each other, the processor 130 may also control the drive unit 120 through the compliance control.

Furthermore, the autonomous mobile apparatus 100 according to the various exemplary embodiments of the present disclosure may measure a repulsive force that occurs due to physical coupling that results when the connection unit 111 is connected to the connector 211 and thus the main body 110 docks with the docking station 200. From the repulsive force that occurs when the autonomous mobile apparatus 100 docks with the docking station 200, the processor 130 may determine whether or not the docking is successfully performed.

When the distance measurement detector 140 measures the repulsive force that occurs when the connection unit 111 and the connector 211 are connected to each other and measures the distance between the autonomous mobile apparatus 100 and the docking station 200 which is equal to or smaller than the predetermined distance, the processor 130 may determine that the docking is successfully performed. For example, when the distance measurement detector 140 measures the repulsive force and measures the distance between the autonomous mobile apparatus 100 and the docking station 200 which is zero, the processor 130 may determine that the docking is successfully performed.

FIG. 3B illustrates a case where all the connection units 111 are not brought into contact with the corresponding connectors 211, respectively, and where the autonomous mobile apparatus 100 thus do not make proper contact with the docking station 200. In other words, FIG. 3B illustrates a case where all the connection units 111 are not brought into contact with the connectors 211, respectively.

When it is determined that the contact is not properly made, the processor 130 may perform control to detect the connection unit 111 which is not in contact with the corresponding connector 211, among the plurality of connection units 111.

As an exemplary embodiment of the present disclosure, when the main body 110 moves in a direction somewhat different from the direction of the docking unit 210, one or several connection units 111 may be brought into contact with one or several corresponding connectors 211, respectively, and the remaining connection units 111 may not be brought into contact with the corresponding connectors 211, respectively. The processor 130 may perform control in such as manner as to detect the connector 111 which is not in contact with the connector 211. In a reattempt for docking, the processor 130 may control the drive unit 120 so that the connection unit 111 not in contact is brought into contact with the corresponding connector 211.

As an exemplary embodiment of the present disclosure, when the main body 110 moves in a direction completely different from the direction of the docking unit 210, none of the connection units 111 may be brought into contact with the corresponding connectors 211, respectively. In the instant case, in a reattempt for docking, the processor 130 may perform control for separating the autonomous mobile apparatus 100 from the docking station 200.

As yet another example, when the distance measurement detector 240 measures the repulsive force that occurs when the connection unit 111 and the connector 211 are connected to each other and measures the distance between the autonomous mobile apparatus 100 and the docking station 200 which is greater than the predetermined distance, the processor 130 may determine that the docking is improperly performed. The present situation occurs when the connection unit 111 and the connector 211 are physically coupled to each other, but the autonomous mobile apparatus 100 does not dock with the docking unit 210 at a normal position thereon. Therefore, although the repulsive force occurs due to the coupling of the connection unit 111 and the connector 211 to each other, the processor 130 may determine that the autonomous mobile apparatus 100 and the docking station 200 are spaced apart.

With reference to FIG. 3B, the processor 130 may control the drive unit 120 according to a position of the connection unit 111 which is not in contact with the corresponding connector 211, among the plurality of connection units 111. In a reattempt for docking, through the compliance control, the processor 130 may control the drive unit 120 so that the main body 110 moves inch by inch and that all the connection units 111 are thus brought into contact with the corresponding connectors 211, respectively.

Furthermore, in a reattempt for docking, the processor 130 may control the drive unit 120 for a predetermined time period or a predetermined number of times. For example, when one or several connections 111 are not in contact with the corresponding one or several connector 211, in a reattempt for docking, the processor 130 may control the drive unit 120 so that all the connection units 111 are brought into contact with the connectors 211, respectively, for the predetermined time period. When the predetermined time period elapses, the processor 130 may control the drive unit 120 so that the docking is interrupted. The predetermined time period or the predetermined number of times may be set to be sufficient for the processor 130 to perform the compliance control of the drive unit 120 for the ducking.

When the docking is interrupted, the processor 130 may transmit an audio warning or a visual warning and thus may alert the user that the docking is interrupted. When a reattempt for docking is made of after the predetermined time period elapses or is made more than the predetermined number of times, the processor 130 may alert to the user that the autonomous mobile apparatus 100 needs to be checked for its docking state. The autonomous mobile apparatus 100 and/or the docking station 200 may include a speaker outputting the audio warning and a display unit on which the visual warning is displayed.

The processor 130 may control the drive unit 120 in the first mode and the second mode, and thus the autonomous mobile apparatus 100 according to the various exemplary embodiments which is described above may be connected to the docking station 200 naturally and smoothly. Therefore, the autonomous mobile apparatus 100 and the docking station 200 may be prevented from colliding with each other during the docking. Furthermore, under the control of the processor 130, the autonomous mobile apparatus 100 may be prevented from being damaged during the docking. The control by the processing 130 provides the advantage that there is no need to increase the strength of the main body 110 or change the design structure thereof.

In an exemplary embodiment of the present disclosure, a coupling groove 410 is formed in an inner surface of the docking station 200 and a coupling protrusion 430 is formed in an outer surface of the main body 110 so that the coupling protrusion 430 of the main body 110 is selectively coupled to the coupling groove 410 of the docking station 200.

Figure 4:
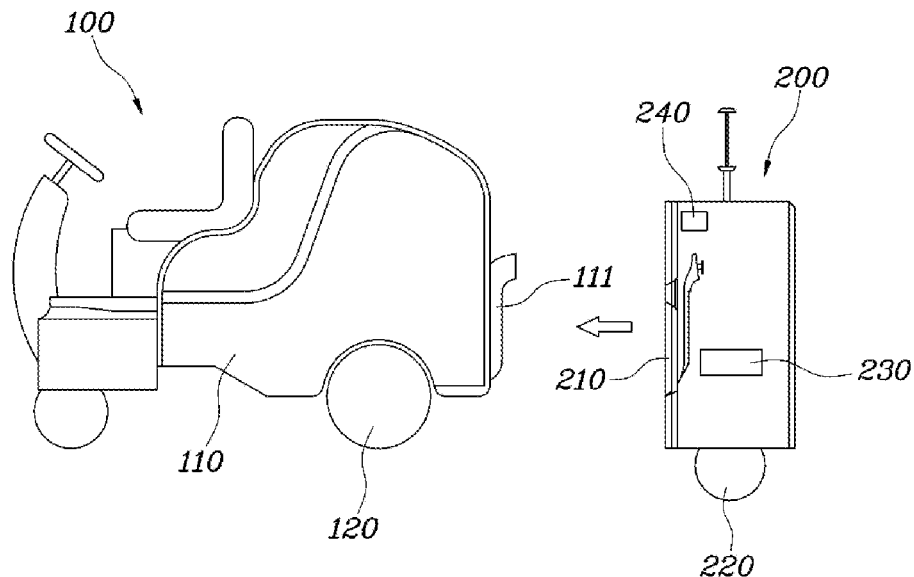
FIG. 4 is a view exemplarily illustrating a state where the autonomous mobile apparatus docks with a docking station according to various exemplary embodiments of the present disclosure.

FIG. 4 is a view exemplarily illustrating a state where the autonomous mobile apparatus 100 docks with a docking station 200 according to various exemplary embodiments of the present disclosure.

In the case of the docking station 200 according to the various exemplary embodiments illustrated in FIG. 4, instead of the autonomous mobile apparatus 100 moving to the docking station 200 for autonomous docking, the docking station 200 autonomously docks with the autonomous mobile apparatus 100 when the autonomous mobile apparatus 100 moves in proximity to the docking station 200. In other words, when the autonomous mobile apparatus 100 moves in proximity to the docking station 200 so that the autonomous mobile apparatus 100 comes within a predetermined distance from the docking station 200, the docking station 200 may bring the docking unit 210 into contact with the connection unit 111. A constituent element used when the docking station 200 according to the various exemplary embodiments are described below, when it is the same as when the autonomous mobile apparatus 100 according to the first element is described above, is provided the same reference numeral, and a detailed description thereof is omitted.

With reference to FIG. 4, the docking station 200 according to the various exemplary embodiments of the present disclosure may include a docking unit 210, a moving device 220, a controller 230, and a distance detector 240. The docking unit 210 is connected to the autonomous mobile apparatus 100. The moving device 220 moves the docking unit 210. The controller 230 controls operation of the moving device 220. The distance detector 240 measures a distance between the autonomous mobile apparatus 100 and the docking station 200.

When docking starts, the autonomous mobile apparatus 100 moves in proximity to the docking station 200.

The controller 230 may receive a signal associated with the distance between the autonomous mobile apparatus 100 and the docking station 200 from the distance detector 240. When a distance measured by the distance detector 240 is equal to or smaller than a predetermined distance, the controller 230 may control the moving device 220 so that the docking unit 210 is brought into contact with the connection unit 111.

Any device or unit configured for adjusting a position of the docking unit 210 may be used as the moving device 220. As an exemplary embodiment of the present disclosure, the moving device 220 may be a wheel configured for adjusting the position of the docking station 200, and the controller 230 may control the wheel so that the docking unit 210 is brought into contact with the connection unit 111. As an exemplary embodiment of the present disclosure, the moving device 220 may be a robot arm connected to the docking unit 210, and the controller 230 may adjust a position of the robot art and thus may bring the docking unit 210 and the connection unit 111 to each other. Furthermore, the controller 230 may perform compliance control of the moving device 220 and thus may bring the docking unit 210 into contact with the connection unit 111.

The docking unit 210 may include a plurality of connectors 211, and a plurality of connection units 111 may be provided in the autonomous mobile apparatus 100. The connection units 111 correspond to the connectors 211, respectively.

The controller 230 may perform control to detect whether or not all the connectors 211 are brought into contact with the corresponding connection units 111, respectively. When all the connectors 211 are brought into contact with the corresponding connection units 111, respectively, the controller 230 may determine that the docking unit 210 of the docking station 200 and the connection unit 111 of the autonomous mobile apparatus 100 are brought into proper contact with each other. When it is determined that the contact is successfully made, the controller 230 may connect the connector 211 to the connection unit 111.

The docking station 200 according to the various exemplary embodiments of the present disclosure may measure a repulsive force of the autonomous mobile apparatus 100 that pushes the docking unit 210 when the connector 211 is connected to the connection unit 111. With the present measurement of the repulsive force, the docking station 200 may determine whether or not the connector 211 and the connection unit 111 are successfully connected to each other.

Furthermore, when all the connectors 211 are not connected to the corresponding connection units 111, respectively, the controller 230 may determine that the contact is not properly made. In the instant case, the controller 230 may perform control to detect the connector 211 which is not in contact with the connector 111. In a reattempt for docking, the controller 230 may control the moving device 220 so that the connector unit 211 not in contact is brought into contact with the corresponding connector 111. At the present point, the controller 230 may control the moving device 220 through the compliance control.

As described above, according to the various exemplary embodiments of the present disclosure, the autonomous mobile apparatus 100 docks with the docking station 200, the autonomous mobile apparatus 100 or the docking station 200 may be controlled through the compliance control.

Figure 5:
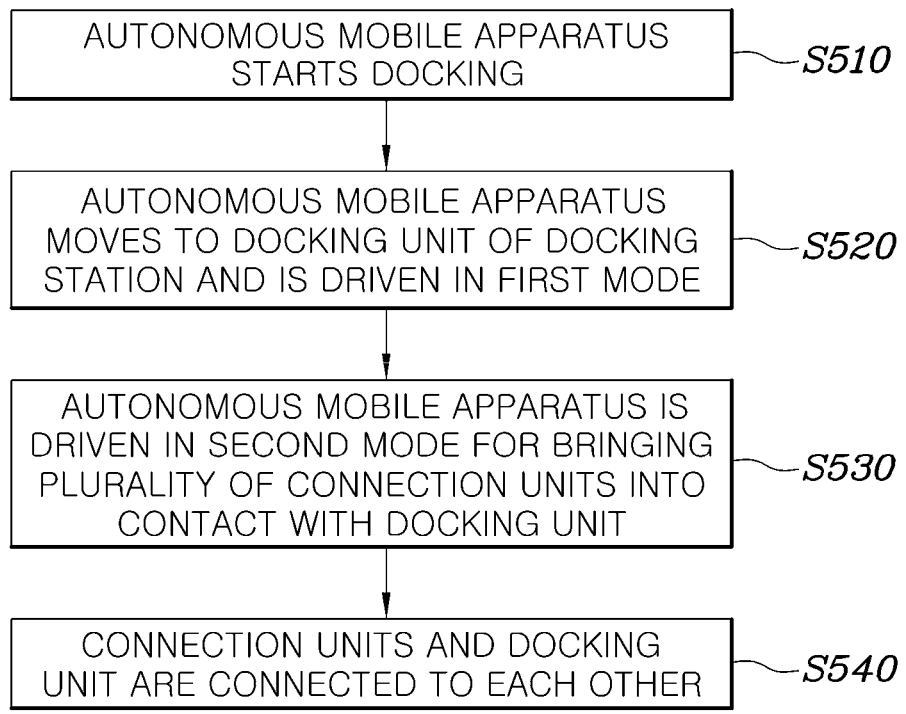
FIG. 5 is a flowchart for a method of controlling the autonomous mobile apparatus according to various exemplary embodiments of the present disclosure.

FIG. 5 is a flowchart for a method of controlling the autonomous mobile apparatus according to various exemplary embodiments of the present disclosure.

In Step S510, the autonomous mobile apparatus 100 may start docking. When a condition for starting the docking is satisfied, the autonomous mobile apparatus 100 may start the docking. For example, an amount of charge remaining in a battery of the autonomous mobile apparatus 100 falls to or below a predetermined numerical value or an amount of load accommodated in the autonomous mobile apparatus 100 falls to or below a predetermined numerical value, the condition for starting the docking may be satisfied.

In Step S520, the autonomous mobile apparatus 100 may be driven in a first mode for causing the autonomous mobile apparatus 100 to move to the docking unit 210 of the docking station 200. When the docking starts, the autonomous mobile apparatus 100 may recognize the position of the docking unit 210 of docking station 200 and may move in a proximity to the docking unit 210.

In Step S530, when the autonomous mobile apparatus 100 moves in proximity to the docking station 200 so that the autonomous mobile apparatus 100 comes within a predetermined distance from the docking station 200, the autonomous mobile apparatus 100 may be driven in a second mode for bringing connection units 111 into contact with the docking unit 210. For example, the autonomous mobile apparatus 100 may be driven in the first mode until the autonomous mobile apparatus 100 moves in proximity to the docking unit 210 so that a distance between the autonomous mobile apparatus 100 and the docking unit 210 is equal to or greater than approximately 100 mm and is equal to or smaller than approximately 500 mm. After the autonomous mobile apparatus 100 moves in proximity to the docking unit 210 so that the autonomous mobile apparatus 100 comes within a predetermined distance from the docking unit 210, the autonomous mobile apparatus 100 may be driven in the second mode for bringing the connection units 111 into contact with the corresponding connectors 211, respectively. The second mode may be executed through the compliance control.

In the second mode, the autonomous mobile apparatus 100 may detect whether or not all the connection units 111 are brought into contact with the corresponding connectors 211, respectively. Thus, the autonomous mobile apparatus 100 may whether or not the contact is properly made. When all the connection units 111 are brought into contact with the corresponding connectors 211, respectively, the autonomous mobile apparatus 100 may determine that the contact is properly made at a proper position on the docking unit 210.

In the second mode, when all the connection units 111 are not brought into contact with the corresponding connectors 211, respectively, the autonomous mobile apparatus 100 may determine that the contact is improperly made. The autonomous mobile apparatus 100 may detect the connection unit 111 which is not in contact with the connector 211 and may move so that the connection unit 111 not in contact is brought into contact with the connector 211. In the instant case, through the compliance control, the autonomous mobile apparatus 100 may bring all the connector units 111 into contact with the corresponding connectors 211, respectively.

In Step S540, when it is determined that the connection unit 111 and the docking unit 210 are brought into proper contact with each other, the autonomous mobile apparatus 100 may connect the connection unit 111 and the docking unit 210 to each other. When all the connection units 111 are brought into contact with the docking unit 210, the autonomous mobile apparatus 100 may determine that the contact is properly made. In the instant case, the autonomous mobile apparatus 100 may physically fasten the connection unit 111 and the docking unit 210 to each other.

Furthermore, when all the connection units 111 are not brought into contact with the docking unit 210, the autonomous mobile apparatus 100 may detect the connection unit 111 which is not in contact with the docking unit 210 and may be driven so that the connection unit 111 not in contact is brought int contact with the docking unit 210. In the instant case, through the compliance control, the autonomous mobile apparatus 100 may bring the connection unit 111 in contact with the docking unit 210.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An autonomous mobile apparatus that autonomously docks with a docking station, the apparatus comprising:
a main body including at least one connection unit configured to be connected to the docking station;
a drive unit configured to move the main body; and
a processor configured to control the drive unit,
wherein the processor is configured to control operation of the drive unit in a first mode for causing the main body to move in proximity to the docking station and a second mode for bringing the at least one connection unit into contact with a docking unit of the docking station, and
wherein the processor is configured to control the drive unit in the first mode to move the main body so that a distance between the main body and the docking station is equal to or smaller than a predetermined distance.

2. An autonomous mobile apparatus that autonomously docks with a docking station, the apparatus comprising:
a main body including at least one connection unit configured to be connected to the docking station;
a drive unit configured to move the main body;
a processor configured to control the drive unit; and
a distance measurement detector configured to measure a distance between the main body and the docking station,
wherein the processor is configured to control operation of the drive unit in a first mode for causing the main body to move in proximity to the docking station and a second mode for bringing the at least one connection unit into contact with a docking unit of the docking station, and
wherein the processor switches from controlling the drive unit in the first mode to controlling the drive unit in the second control based on the distance measured by the distance measurement detector.

3. An autonomous mobile apparatus that autonomously docks with a docking station, the apparatus comprising:
a main body including at least one connection unit configured to be connected to the docking station;
a drive unit configured to move the main body; and
a processor configured to control the drive unit,
wherein the processor is configured to control operation of the drive unit in a first mode for causing the main body to move in proximity to the docking station and a second mode for bringing the at least one connection unit into contact with a docking unit of the docking station,
wherein the autonomous mobile apparatus further includes a plurality of connection units and a plurality of connectors that correspond to the corresponding connection units, respectively, is provided in the docking unit,
wherein the processor is configured to perform control to detect whether all the connection units are brought into contact with the connectors, respectively,
wherein when all the connection units are brought into contact with the corresponding connectors, respectively, the processor is configured to determine that the contact is properly made, and
wherein when the processor concludes that the contact is properly made, the processor is configured to control the drive unit so that the connection units and the corresponding connectors is physically fastened to each other.

4. The autonomous mobile apparatus of claim 3, wherein a coupling protrusion is formed in an outer surface of the main body so that the coupling protrusion of the main body is selectively coupled to a coupling groove of the docking station.

5. An autonomous mobile apparatus that autonomously docks with a docking station, the apparatus comprising:
a main body including at least one connection unit configured to be connected to the docking station;
a drive unit configured to move the main body; and
a processor configured to control the drive unit,
wherein the processor is configured to control operation of the drive unit in a first mode for causing the main body to move in proximity to the docking station and a second mode for bringing the at least connection unit into contact with a docking unit of the docking station,
wherein the autonomous mobile apparatus further includes a plurality of connection units and a plurality of connectors that correspond to the corresponding connection units, respectively, is provided in the docking unit,
wherein the processor is configured to perform control to detect whether all the connection units are brought into contact with the connectors, respectively,
wherein when all the connection units are brought into contact with the corresponding connectors, respectively, the processor is configured to determine that the contact is properly made, and
wherein when at least a connection unit is not brought into contact with the corresponding connector, respectively, the processor is configured to determine that the contact is improperly made, to perform control to detect the at least one connection unit which is not in contact among the connection units, and to control the drive unit so that the at least one connection unit not in contact is brought into contact with the corresponding connector.

6. The autonomous mobile apparatus of claim 5, wherein the processor is configured to control the drive unit for a predetermined time period or a predetermined number of times so that the connection units are brought into contact with the docking unit, and when the predetermined time period elapses or the predetermined number of time is exceeded, the processor is configured to control the drive unit so that the docking is interrupted.

7. An autonomous mobile apparatus that autonomously docks with a docking station, the apparatus comprising:
a main body including at least one connection unit configured to be connected to the docking station;
a drive unit configured to move the main body; and
a processor configured to control the drive unit,
wherein the processor is configured to control operation of the drive unit in a first mode for causing the main body to move in proximity to the docking station and a second mode for bringing the at least connection unit into contact with a docking unit of the docking station, and
wherein the processor is configured to measure a repulsive force that occurs due to physical coupling that results when the at least one connection unit is connected to a corresponding connector of the docking station and from the repulsive force, the processor is configured to determine whether the docking is successfully performed.

8. A docking station with which an autonomous mobile apparatus docks, the docking station comprising:
a docking unit configured to be connected to the autonomous mobile apparatus;
a moving device configured to move the docking unit;
a controller configured to control the moving device; and a distance measurement detector configured to measure a distance between the autonomous mobile apparatus and the docking station, wherein when the autonomous mobile apparatus moves in proximity to the docking unit, the controller is configured to control operation of the moving device so that the docking unit is brought into contact with a connection unit of the autonomous mobile apparatus, and wherein the controller is configured to control the moving device so that the docking unit is brought into contact with the connection unit, based on the distance measured by the distance measurement detector.

9. A docking station with which an autonomous mobile apparatus docks, the docking station comprising:

a docking unit configured to be connected to the autonomous mobile apparatus;

a moving device configured to move the docking unit; and a controller configured to control the moving device, wherein when the autonomous mobile apparatus moves in proximity to the docking unit, the controller is configured to control operation of the moving device so that the docking unit is brought into contact with a connection unit of the autonomous mobile apparatus, wherein the docking unit includes a plurality of connectors, wherein a plurality of connection units that correspond to the connectors, respectively, is provided in the autonomous mobile apparatus, wherein the controller is configured to perform control to detect whether all the connectors are brought into contact with the corresponding connection units, respectively, wherein when all the connectors are brought into contact with the corresponding connection units, respectively, the controller is configured to determine that the contact is properly made, and wherein when at least a connector is not brought into contact with the corresponding connection units, respectively, the controller is configured to determine that the contact is improperly made, to perform control to detect a connector which is not in contact among the connectors, and to control the moving device so that the connector not in contact is brought into contact with the corresponding connection unit.

10. A method of controlling an autonomous mobile apparatus that docks with a docking station, the method comprising:

starting, by the autonomous mobile apparatus, docking;

executing a first mode for causing the autonomous mobile apparatus to move to a docking unit of the docking station, so that the autonomous mobile apparatus moves in proximity to the docking station within a predetermined distance;

executing a second mode for causing the autonomous mobile apparatus to bring a plurality of connection units into contact with a plurality of connectors, respectively, of the docking unit; and connecting the connection unit and the docking unit to each other when it is determined that the connection unit is brought into proper contact with the docking unit.

11. The method of claim 10, wherein in the executing of the second mode, compliance control of the autonomous mobile apparatus is performed so that with a force exerted on the autonomous mobile apparatus, the connection unit is brought into contact with the docking unit.

12. The method of claim 10, wherein in the executing of the second mode, it is determined whether all the connection units are brought into contact with the corresponding connectors, respectively, and when all the connection units are brought into contact with the corresponding connectors, respectively, it is determined that the contact is properly made.

13. The method of claim 10, wherein in the executing of the second mode, when at least a connection unit is not brought into contact with the corresponding connectors, respectively, it is determined that the contact is improperly made, control is performed to detect the connection unit which is not in contact among the connection units, and the autonomous mobile apparatus is controlled so that the at least a connection unit not in contact is brought into contact with the corresponding connectors.

14. The method of claim 10, wherein when a distance measured by a distance detector between the autonomous mobile apparatus and the docking station is equal to or smaller than a predetermined distance, a controller of the docking unit is configured to control a moving device of the docking unit so that the docking unit is brought into contact with the connection units of the autonomous mobile apparatus.

* * * * *